UNITED STATES PATENT OFFICE.

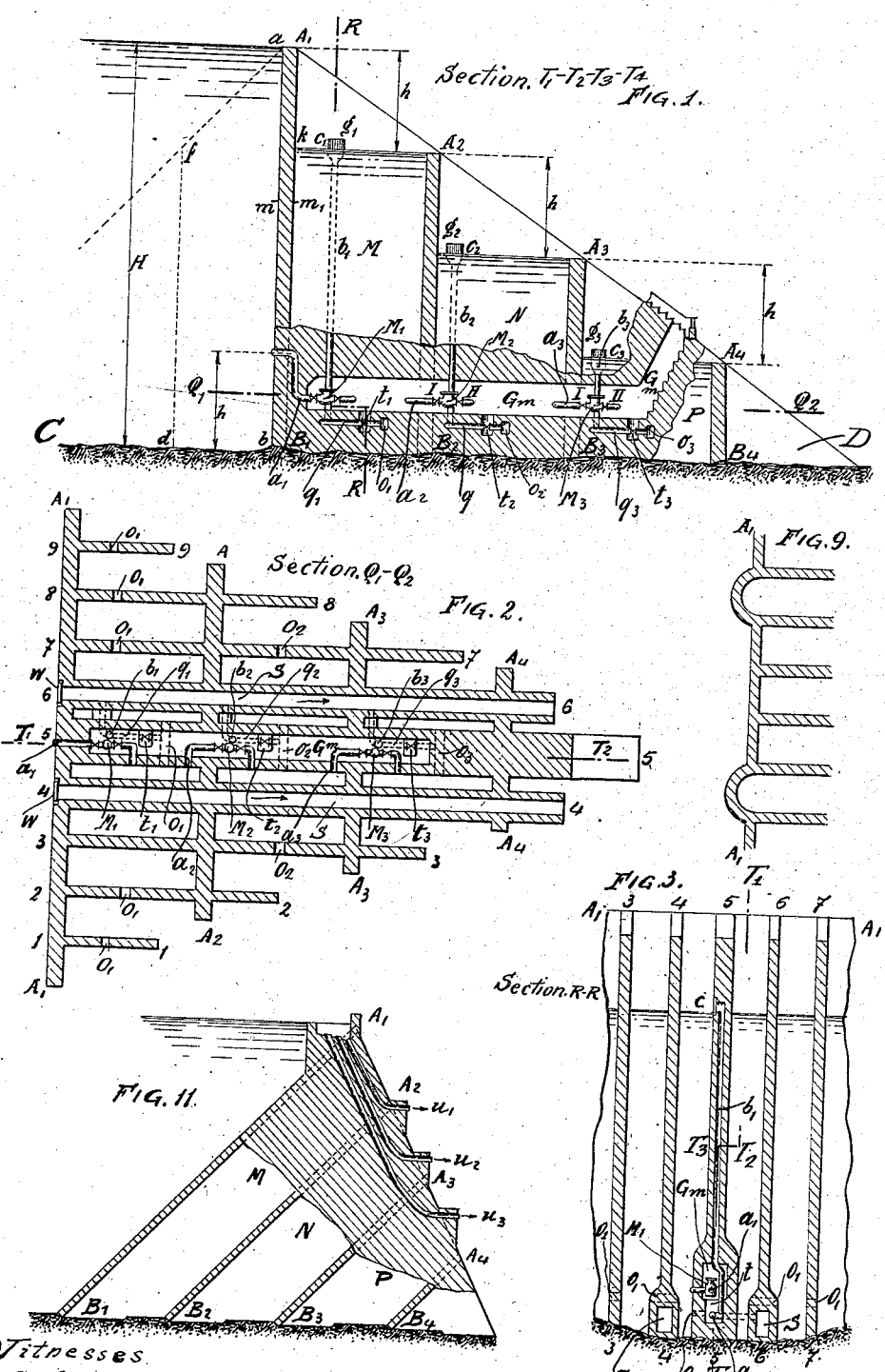

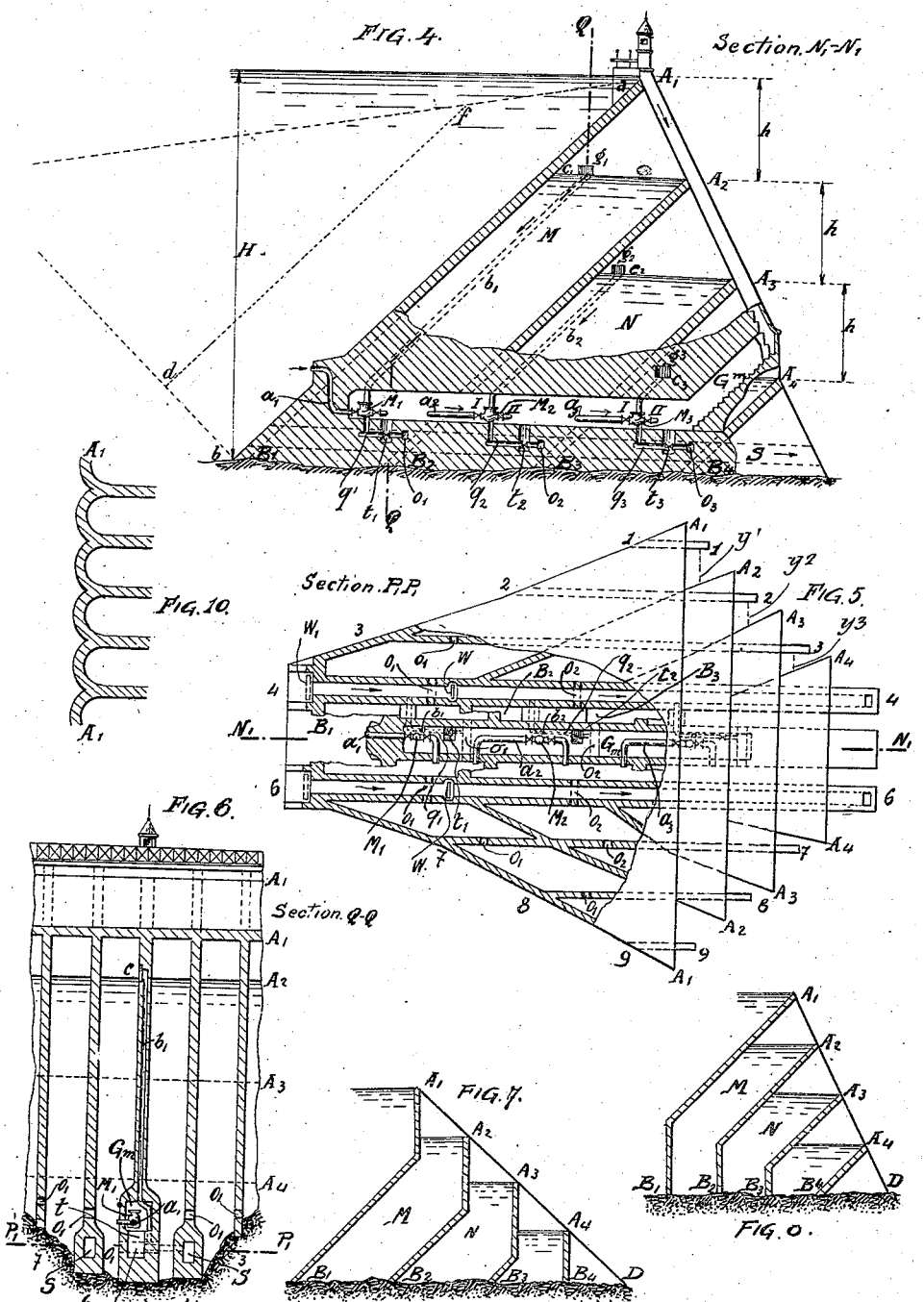

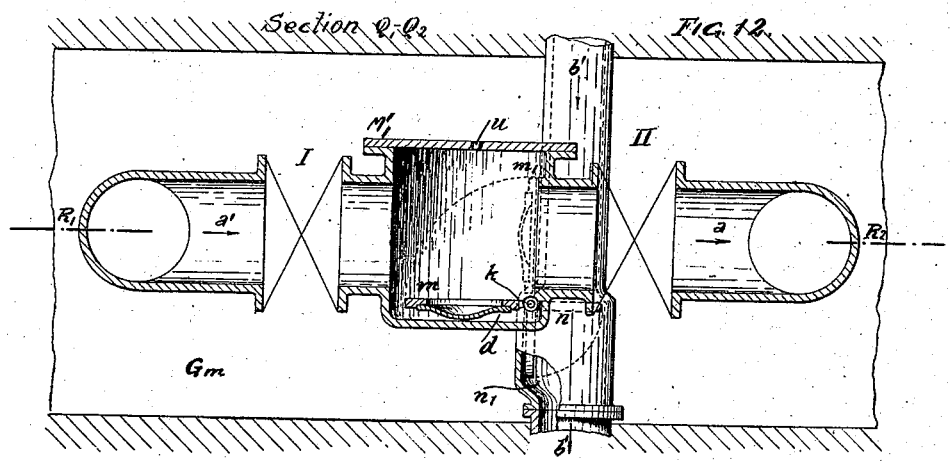
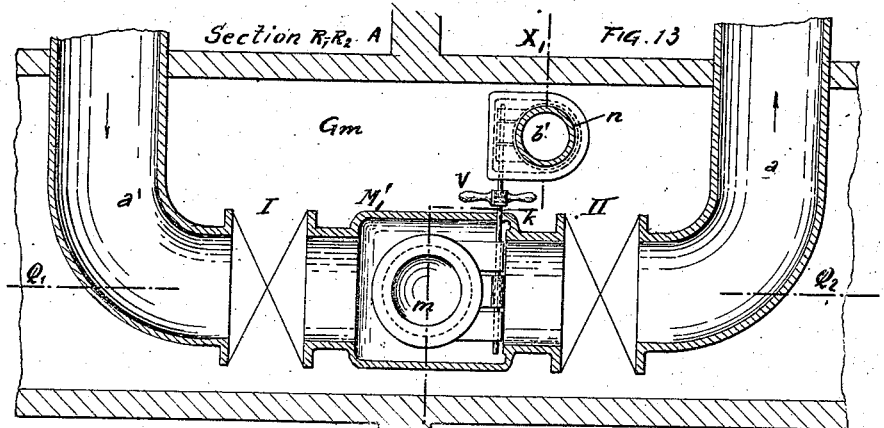
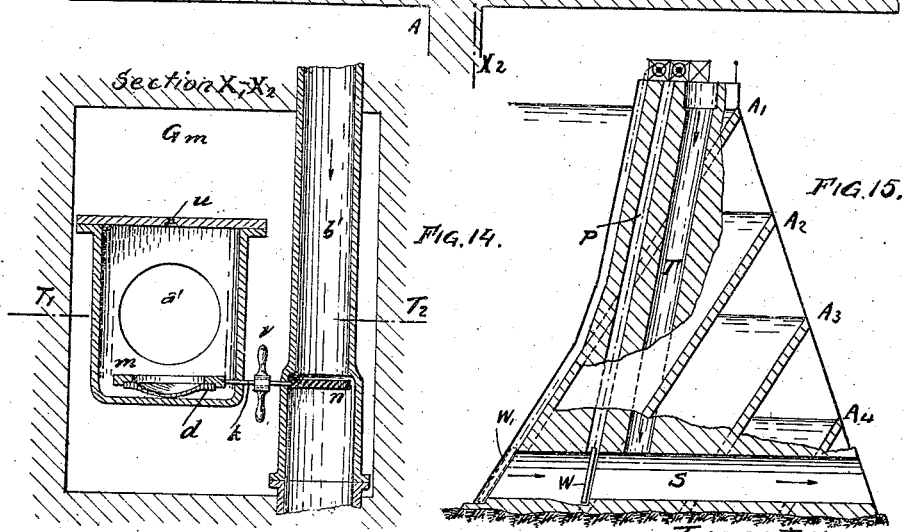

PETR RUTENBERG, OF GENOA, ITALY.

DAM.

1,167,116. Specification of Letters Patent. Patented Jan. 4, 1916.

Application filed November 29, 1912. Serial No. 734,089.

*To all whom it may concern:*

Be it known that I, PETR RUTENBERG, a subject of the Emperor of Russia, residing at 42 Via Assarotti, Genoa, in the Kingdom of Italy, have invented certain new and useful Improvements in Dams, of which the following is a specification.

This invention relates to improvements in dam structures, and pertains particularly to a dam constructed of a plurality of reservoirs or chambers in which the total water-head is broken up into any desired number of small bodies, in order to regulate or distribute the water pressure which acts on the dam.

The invention has for its object to break up independently of the depth of the water, the pressure thereof into arbitrarily small quantities, in order to decrease the danger arising from the use of dams in which a structure receives the whole head of pressure at one point of stress.

The invention also contemplates the reduction of the danger due to a break in the dam, and a consequent instantaneous discharge of the whole body of confined water by providing a dam in which a break is easily repaired, the leakage of water is slight and the dam is not put out of operation thereby.

The invention is disclosed in the drawings, in which—

Figure 1 is a section through the dam at two different places, the upper part of the figure being a section through the chambers, and the lower part being a section through the supply passages with the communicating conduits between the chambers indicated as taken on the line $T_1$, $T_2$, $T_3$, $T_4$ of Fig. 2. Fig. 2 shows a horizontal section through the dam on the line $Q_1$, $Q_2$, Fig. 1. Fig. 3 is a section taken on the line $R_1$, $R_2$, Fig. 1. Fig. 4 shows a section similar to Fig. 1 through a modified form of the invention, wherein the lower part of the figure is a section taken on the line $N_1$, $N_2$ of Fig. ⁂. Fig. 5 is a plan view partly in section of the form shown in Fig. 4. Fig. 6 is a section on the line $Q$, $Q$, of Fig. 4. Figs. 7 and 8 are diagrammatic views of other modifications. Figs. 9 and 10 show special forms of the dam walls in horizontal section. Fig. 11 shows a form of the pressure conduits shown in section. Fig. 12 is a section taken on line $Q_1$, $Q_2$, of Fig. 13, showing the cutting off mechanism in the supply conduits together with its regulating mechanism. Fig. 13 is a section taken on line $R_1$, $R_2$ of Fig. 12. Fig. 14 is a section taken on the line $X_1$, $X_2$ of Fig. 13, and Fig. 15 is a section through the discharge galleries for sediment, together with a valve for the same.

According to this invention the total water-head which is indicated by the letter H, is subdivided by means of a number of water reservoirs M, N, P, formed by transverse walls $A_1 B_1$, $A_2 B_2$, $A_3 B_3$, $A_4 B_4$, each of the latter diminishing in height in the down stream direction in such a way as to provide, in the above mentioned reservoirs, levels which decrease step by step from up-stream to down-stream. The walls $A_1 B_1$, etc., are supported by a plurality of longitudinal walls or buttresses 1—1, 2—2, 3—3, ... 9—9, which form with the transverse walls a unitary structure. Said supporting walls or buttresses are provided at suitable intervals with transverse openings $o_1$, $o_2$, $o_3$ which permit the passage of water therethrough, while the transverse walls are water-tight. The transverse and longitudinal walls above mentioned thus form transverse and longitudinal series of reservoirs, and those reservoirs lying transversely next to one another as between successive walls 1—1, 2—2, etc., permit the water to stand at equal levels therein. Each wall $A_1 B_1$, $A_2 B_2$ ... is subjected to a pressure of water corresponding to the difference of the levels of water on each of its sides, that is, it is subjected to a pressure equal to the difference between the pressure against its up-stream face and the counter pressure against its down-stream face. At any point $m$ on the up-stream face of a wall, as $A_1 B_1$, Fig. 1, the pressure of the water would be $$am - km_1 = ak = h = \frac{H}{n},$$

where $n$ equals the total number of transverse walls, H the total water-head and $h$ the difference in height between successive walls. The diagram of the head of water of the up-stream face of each wall, instead of being represented by a triangle $a$, $b$, $c$, Fig. 1, as in an ordinary dam is represented in the present instance by the trapezium $a$, $b$, $d$, $f$. At the depth $h$ at the point $k$ corresponding to the level of the water in the next lower reservoir the water-head reaches its maximum value $$h = \frac{H}{n},$$

which value is maintained until the ground surface or base $b$ at the bottom of the wall A, B, is reached. It is not necessary, if it be otherwise preferable, that the value $h$ be the same for each of the transverse walls, but on the other hand, the upper surface of the body of water inclosed in each of the reservoirs M, N, P, etc., may be at varying heights from the top of the next higher wall. Furthermore, according to local and constructional requirements the difference of level $h$ may be chosen arbitrarily small, by employing a larger number $n$ of the transverse walls. That is to say, for any height of water-head one can render the pressure of the water arbitrarily small, this being one of the principal aims in securing the highest degree of stability in a dam.

The transverse walls which serve to subdivide the total head $H$ can be constructed either vertically as shown in Fig, 1, or inclined as shown in Fig. 4, or partially vertical and partially inclined as shown in Figs. 7 and 8. Furthermore, each wall instead of having a flat surface can have a bent one, forming a single arch or a number of arches, or any combination of arches and of flat surfaces, in connection with the buttresses, as indicated in Figs. 9 and 10.

The maximum value of the difference of level $h$, which is fixed for each transverse wall, is maintained automatically by means of auto-regulators. Said auto-regulators (Figs. 1–6 and 12–14) consist, for each wall $A_1 B_1$, $A_2 B_2$ . . . of the horizontal pipe sections $a_1$, $a_2$, $a_3$ which connect each up-stream reservoir or chamber with the next lower or down-stream reservoir, and vertical pipe sections $b_1$, $b_2$, $b_3$, whose intakes $c_1$, $c_2$, $c_3$ respectively determine the maximum water level in the reservoir which lie on the down-stream side of the several transverse walls. The pipes $a_1$, $a_2$, $a_3$ and $b_1$, $b_2$, $b_3$ cross one another in a service passage or gallery $G_m$. Through each pipe extends a horizontal axis or shaft $k_1$, which supports the two valves $m$ and $n$, so that they stand in rigid relation to one another. The weight of valve $m$ is greater than that of the valve $n$, so that both valves normally assume a horizontal position (Figs. 12–14). The pipes $a_1$, $a_2$, $a_3$ are thus normally open while the pipes $b_1$, $b_2$, $b_3$ are normally closed. The water confined above the dam enters into the upper set of open pipes $a_1$ and passes unhindered into the first and subsequently into each of the following reservoirs M, N, P . . . , filling each of said reservoirs to its capacity. As soon as the entering water has reached the maximum level in the last down-stream reservoir P, it flows into the intake $c_3$ of the pipe $b_3$ (Fig. 1) and collects in said pipe above the valve $n_3$, tending to push the valve $n_3$ downwardly, whereby the therewith rigidly connected valve $m_3$ is pushed into a vertical position, thereby closing the pipe $a_3$ and cutting off the passage of the water to the lowest down-stream reservoir P. The valve $m_3$ then remains closed to the water pressure from the up-stream side of the transverse wall $A_3 B_3$. The same operation is repeated successively in each of the preceding reservoirs N, M, while the water level in the lake above the dam rises. When the water level in the lake formed above the dam sinks and assumes a lower level than the water in the first up-stream reservoir M of the dam, then by reason of the pressure of the water the valve $m$ is opened and the therewith rigidly mounted valve $n$ is again returned to its original horizontal position, whereby the water-head in the reservoirs and in the lake may return to normal. The same process is carried out in each of the lower lying reservoirs in succession, while the level of the water in the lake falls.

The central portion of each valve $m$ is provided with an easily removable thin tight wall or section $d$ whose power of resistance is only slightly greater than the above mentioned maximum water pressure $h$ between the two adjacent containers or reservoirs. When for any unusual reason, the water-level falls in any one of the reservoirs of the dam, while the valve $m$ which lies up-stream remains in vertical position, and the difference of water-level in the two adjacent reservoirs becomes greater than the aforementioned quantity $h$, then said safety diaphragm $d$ is broken by the increased water pressure, so that a passage of the water is permitted and a refilling of the down-stream reservoir for the establishment of the necessary back-pressure occurs.

The valve $m$ is mounted in an iron housing or casing $M_1$, which can be opened and closed by means of either of two valves I and II which are located up-stream and down-stream respectively, with regard to the casing $M_1$, when an inspection or change of the valve $m$ or the diaphragm $d$ is necessary. The valve $n$ can be arranged in a similar housing. The axle or shaft $k$ of the valves $m$ and $n$ is also provided with a hand-wheel $v$, by means of which both valves can also be operated by hand, to move them into either position.

The intake $c_1$, $c_2$, $c_3$ of the pipes $b_1$, $b_2$, $b_3$ are provided with a grating $g$ (Figs. 1, 3, 4 and 6) to prevent the passage of foreign bodies and substances therein. Since the pipes $b_1$, $b_2$, $b_3$ are empty, except during the few moments required for filling said pipe for the purpose of opening the valve $n$ it is impossible for ice to form therein, and furthermore, the ice from the reservoirs of the dam can not gain access thereto, since it forms below the level of the intake $c_1$, $c_2$, $c_3$.

The pipes or conduits, $a_1$, $a_2$, $a_3$, can be cleaned of sediment or deposits by opening the valve $m$ for a few minutes by hand, when the lake and reservoirs of the dam are full of water.

The resistance of the walls $A_1 B_1$, $A_2 B_2$, $A_3 B_3$ ... is measured for a water-head $h$. The intake of the pipe $a_1$ of the first upstream wall $A_1 B_1$ of the dam can therefore be located at the height $h$ above the base of the dam in order to avoid any eventual clogging of the pipe by deposits or sediment. By a slight increase of the resistance of the lowest part of the first wall $A_1 B_1$ this height can also be increased. The service gallery G and pipes $a_1$, $a_2$, $a_3$ and $b_1$, $b_2$, $b_3$ of the automatic water head regulator can also be doubled, tripled or otherwise increased in number.

For carrying off the deposits and sediment, the cleaning or flushing galleries or conduits S (Figs. 2–6 and 15) are provided, said conduits or galleries being closed by means of cut offs or valves W. In order to prevent these valves from being clogged or jammed by sediment, they are arranged in the galleries proper. In order to permit their repair or inspection, further valves $W_1$ are provided which can be used to temporarily close the passage of the water through the galleries. The valve W is generally opened during periods of high water, in order to utilize the surplus water and the high pressure for cleaning the deposits from the lake. In order to relieve these valves, the galleries or conduits S are connected near their up-stream ends with vertically arranged shafts T. Thus, during the times of high water, the valves W are relieved of a portion of the up-stream pressure by the water which enters the shafts T and backs against the valves W, so that they can be easily raised by means of the chains or ropes $p$ independently of the depth of the dam structure. Another means provided for cleaning the reservoirs M, N, P, consists of conduits $q$, $q_1$ ... and the valves $t_1$, $t_2$ ... (Figs. 1 and 2), the latter being adapted to be operated from the service passage or gallery $G_m$. The openings $o$, $o_1$, $o_2$ ... are normally filled with water, and when an attendant in the gallery $G_m$ opens the valves $t$, $t_1$ ... the water flushes through the corresponding conduits $q_1$, $q_2$ ..., which turns at right angles (Fig. 2) to connect with the flushing or cleaning galleries S.

During times of high water, the stability of the above described dam is increased, instead of being decreased as has been the case with dams heretofore in use. On the one hand this result is secured by reason of the fact that the body of water which passes over the dam is divided by means of the water reservoirs M, N, P ... forming a series of steps, and by the fact that the thrust of the several water falls is absorbed by the several water reservoirs which act as cushions. Furthermore, it also appears that the length of the overflow edge or spillway of each wall $A_1 B_1$, $A_2 B_2$ ... decreases successively in the direction of the fall, and the water, which goes over the spillway, therefore increases in the height of its body, thus diminishing the normal difference of the levels for each wall and increasing the counter pressure exercised upon each of the walls, thereby decreasing the difference in the pressure and the counter pressure in proportion to the normal difference in level $h$. By this dam construction, other related problems in connection with the construction of large dams are avoided.

It may occur that the action of the overflow, which occurs from the over-flow edges of the walls $A_1 B_1$, $A_2 B_2$ ... will not prove sufficient for the carrying off of the flood water. In this case there are arranged in the upper, least-burdened part of the supporting walls 1—1, 2—2, ... a series of chambers or passages $u_1$, $u_2$, $u_3$, (Fig. 11), in sufficient number, which are provided with horizontal up-stream inlets and down-stream outlets which are located at suitable heights and operate as do the pressure pipes in order to permit the passage of the water in suitable quantity. The reservoirs which are formed by the walls of different heights can also be used for the further purpose of storing the water and can also be adapted to simultaneously serve as locks for navigation. For this latter purpose, movable sluices or gates $y_1$, $y_2$, as indicated in dotted lines in Fig. 5 may be provided.

Should it be desired to increase the original depth of the dam, it is possible to increase the lengths of the supporting walls 1—1, 2—2, 3—3 ... downstream and to add to the height of the transverse walls of the dam and thereby increase the depth of the water head. Such a provision for the increase in the depth of the water is not possible in dams which have heretofore been constructed.

Dams of the above described kind can be built without regard to the height of the dam upon ground of any kind, without the necessity of first seeking a rock bottom or similar foundation. The several walls need only be built far enough into the ground, so that the resistance of the alluvial soil to the filtration of the water through the ground is sufficiently great to withstand the water pressure and the value of the partial pressure $h$ for the particular dam. When the ground is only capable of a slight resistance or possesses little stability the walls must naturally be set up upon foundations of sufficient width.

The above described dam construction will not only serve for damming rivers and torrents, but will also serve for any sort of reservoir or canal, and can be constructed of any suitable material such as reinforced concrete, masonry, metal, wood or simple concrete, or any combination of the above mentioned materials, and may serve for the retention of any sort of fluid such as water, mineral oils, etc.

What I claim as my invention is:—

1. A dam construction comprising in combination, longitudinal and transverse walls forming series of reservoirs longitudinally of a stream, successive reservoirs decreasing in depth in the direction of flow of the stream, means for filling one reservoir from the contents of the preceding reservoir, and means controlled by the overflow of the reservoir to cut off the supply thereto.

2. A dam construction comprising in combination, successive walls forming a series of liquid containing reservoirs of successively diminishing depth in the direction of flow of the stream, means for filling each reservoir from the preceding one, and means controlled by the overflow of said reservoir for cutting off the supply thereto.

3. A dam construction comprising in combination, longitudinal and transverse walls forming series of reservoirs of successively decreasing depth in the direction of flow of the stream, means to fill the first up-stream reservoir from the dammed up water and each successive reservoir from the preceding reservoir, and means controlled by the overflow of each reservoir for cutting off the water supply thereto.

4. A dam construction comprising in combination, a plurality of transverse walls of successively decreasing height in the direction of current flow, longitudinal walls joining said transverse walls and forming therewith series of alined reservoirs of equal depth and in transverse rows, successively decreasing in depth in rows in the direction of flow, means to admit water from the dammed up water to the first transverse row and successively to each following row down stream from the preceding row, said means operating through the transverse walls, and means controlled by the overflow in each row to close said water admitting means thereto.

5. A dam construction, comprising in combination, longitudinal and transverse walls forming series of reservoirs of successively decreasing depth in the direction of flow of the stream and each reservoir receiving the overflow from the preceding reservoir, means to fill the first up-stream reservoir from the dammed up water and each successive reservoir from the preceding reservoir, means to relieve the pressure in preceding reservoirs when any wall collapses and means controlled by the overflow in each reservoir to maintain the water at regulated levels in said reservoir.

6. A dam construction comprising in combination, successive walls forming a series of liquid containing reservoirs of successively diminishing depth in the direction of flow of the stream, means for filling each reservoir from the preceding reservoir, means controlled by the overflow from each reservoir for cutting off the supply thereto, and a gallery containing said filling and controlling means.

7. A dam construction comprising in combination, successive walls forming a series of liquid containing reservoirs of successively diminishing depth in the direction of flow of stream, supply conduits joining each reservoir to the preceding one, a valve in each supply conduit, a vertical conduit in each reservoir for receiving the overflow therefrom, and a valve in each vertical conduit operatively connected to the valve in the adjacent supply conduit so that the overflow into said vertical conduit will act to shut off the supply to its respective reservoir through the adjacent supply conduit.

In testimony whereof I affix my signature in presence of two witnesses.

PETR RUTENBERG.

Copies of this patent may be obtained for five cents each, by addressing the "Commissioner of Patents, Washington, D. C."